Figure 5:
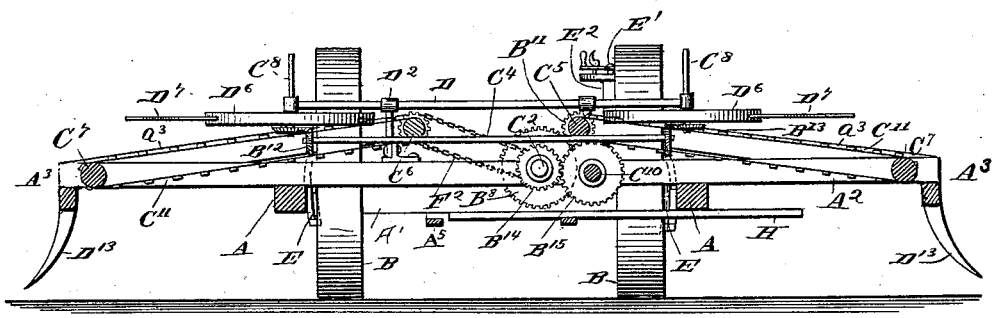

(No Model.) 7 Sheets—Sheet 1.
J. A. BOEHLER.
CORN HARVESTER.
No. 537,140. Patented Apr. 9, 1895.
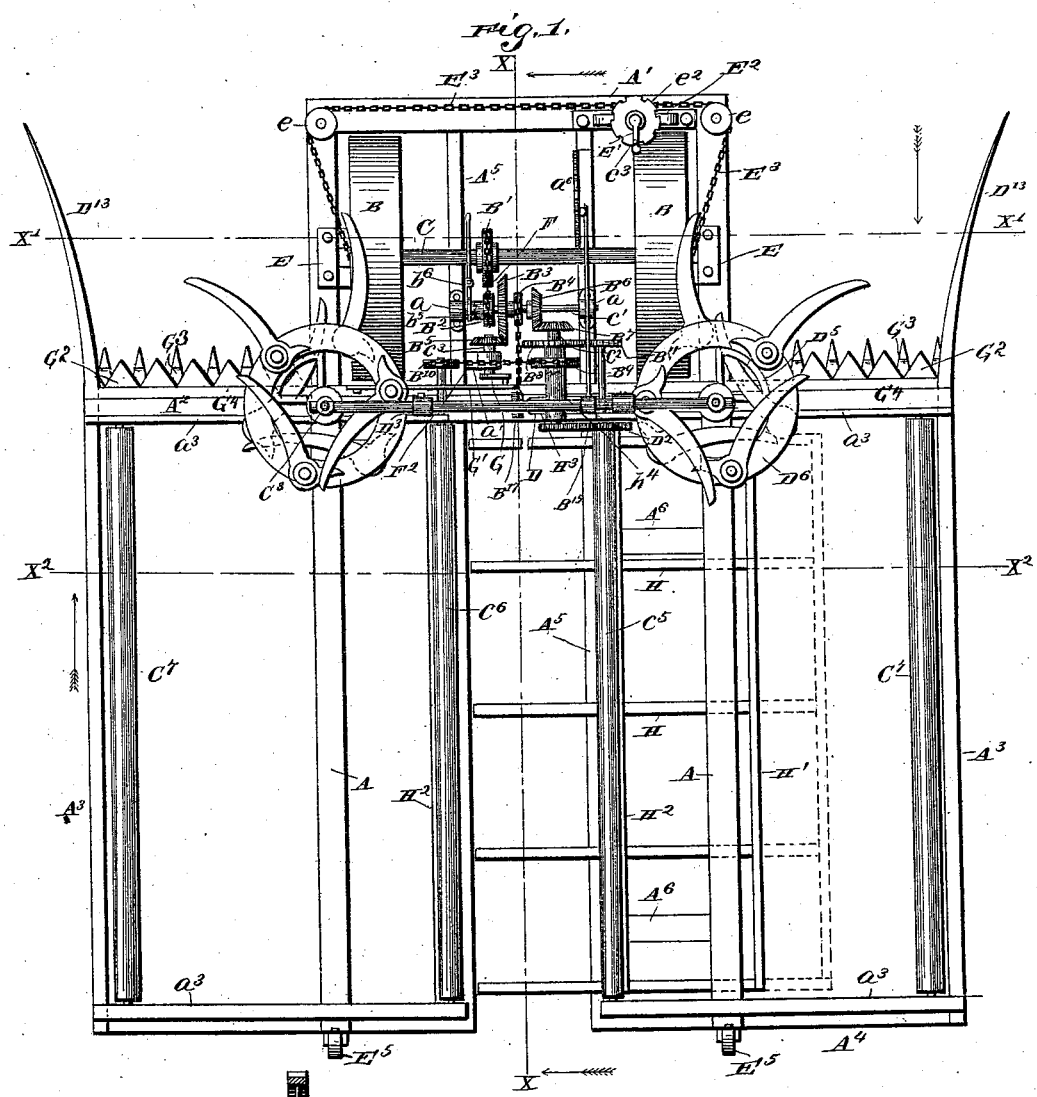
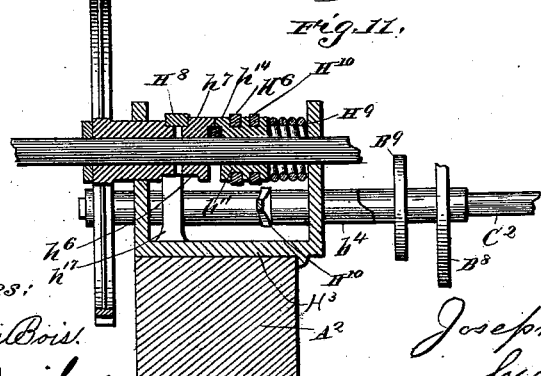
Witnesses:
Alex. B. DuBois.
Tad A. Bailey.
Inventor:
Joseph Anton Boehler
By N. DuBois his Atty (No Model.)  J. A. BOEHLER.  7 Sheets—Sheet 2.
CORN HARVESTER.
No. 537,140.  Patented Apr. 9, 1895.
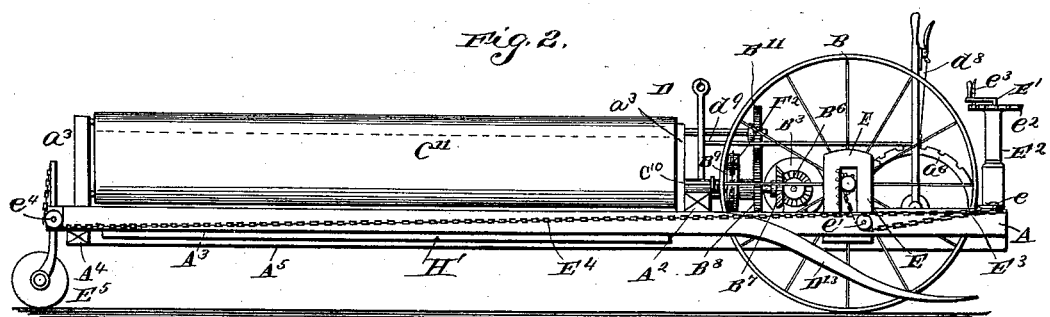
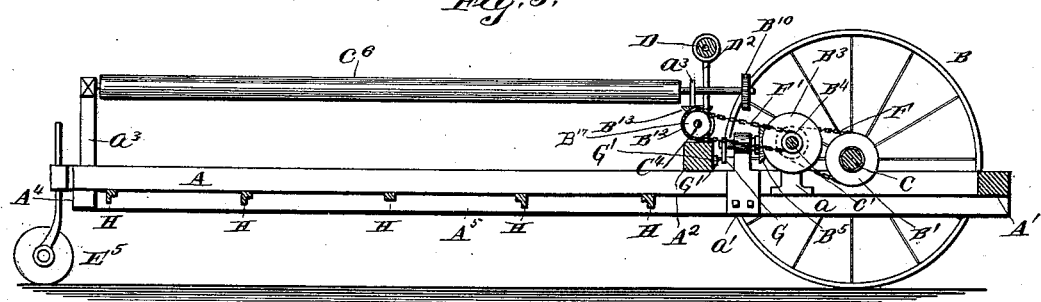
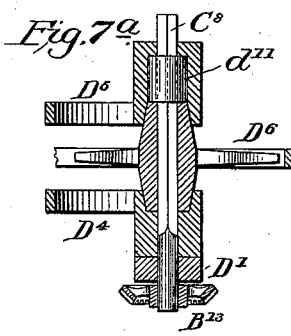
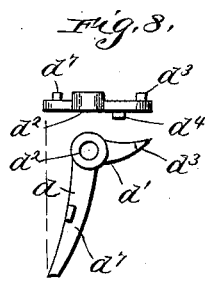
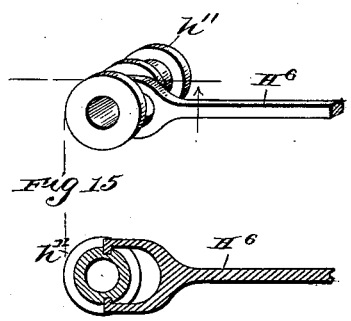
Witnesses:
Tad A. Bailey.
Alex. D. DuBois.
Inventor:
Joseph Anton Boehler
by N. DuBois his atty (No Model.)  J. A. BOEHLER.  7 Sheets—Sheet 3.
CORN HARVESTER.

No. 537,140.  Patented Apr. 9, 1895.

Witnesses:
Alex. D. DuBois.
Tad A. Bailey.

Inventor:
Joseph Anton Boehler,
by N. DuBois his atty.

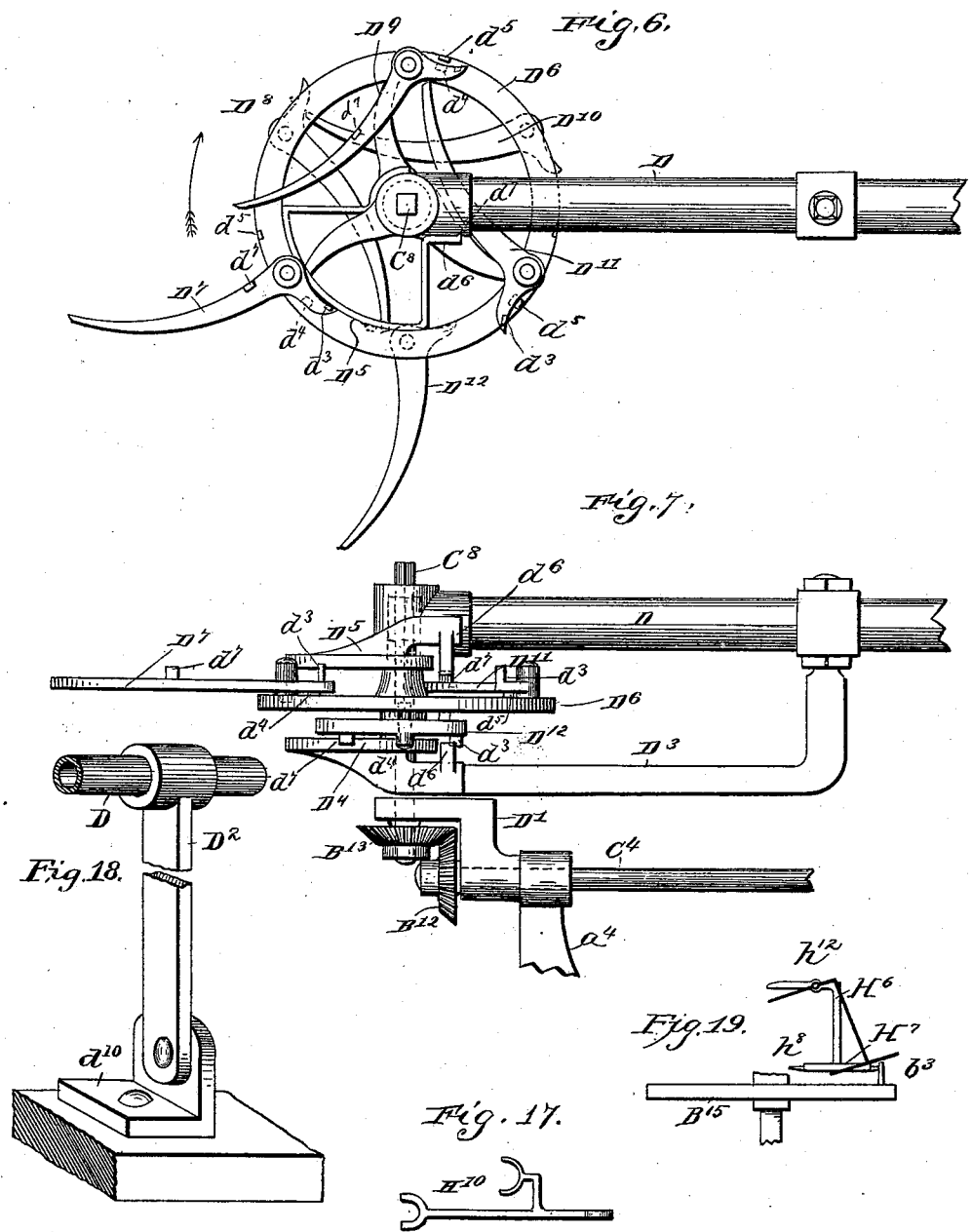

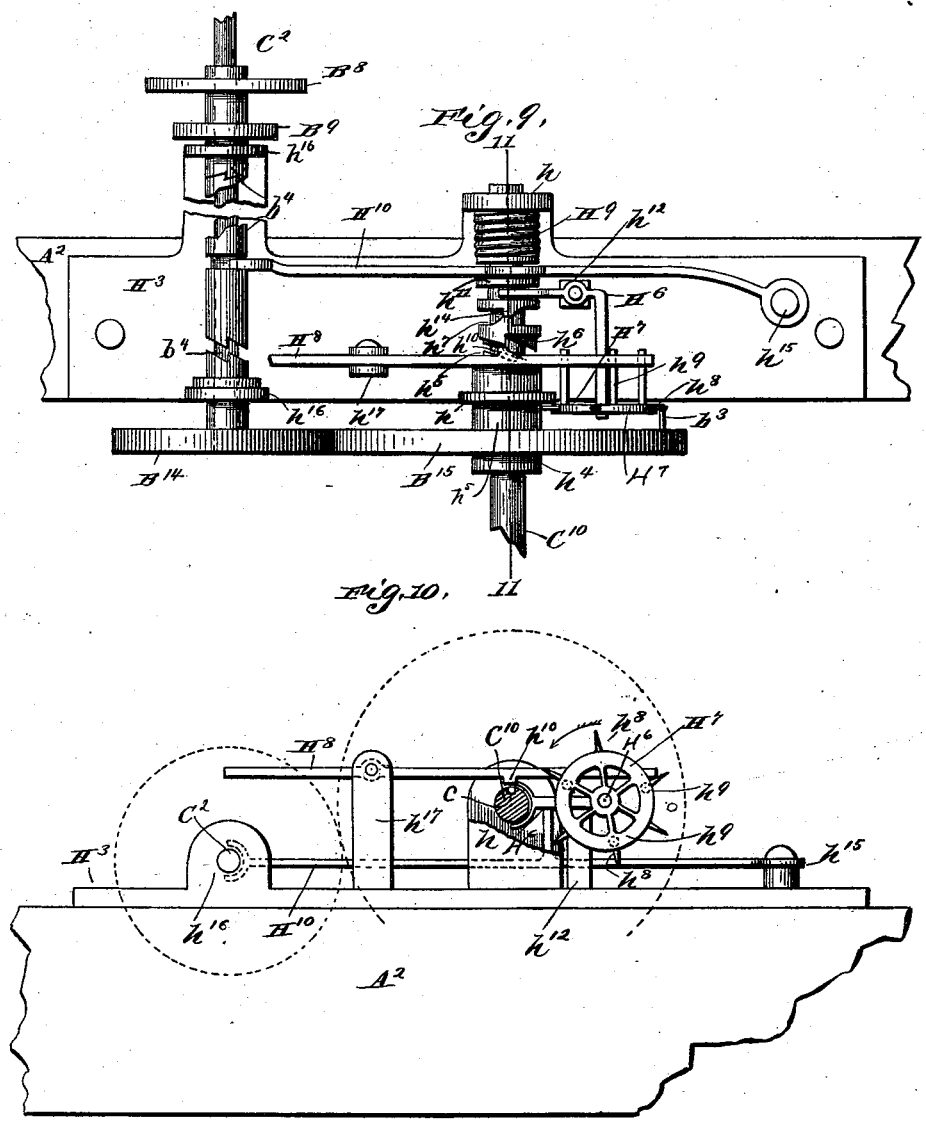

(No Model.) 7 Sheets—Sheet 6.
J. A. BOEHLER.
CORN HARVESTER.

No. 537,140. Patented Apr. 9, 1895.

Witnesses:
Tad A. Bailey.
O. T. Brandom.

Inventor:
Joseph Anton Boehler
by N. DuBois his Atty (No Model.) 7 Sheets—Sheet 7.

J. A. BOEHLER.
CORN HARVESTER.

No. 537,140. Patented Apr. 9, 1895.

Witnesses.
T. A. Bailey
J. M. Buchwing

Inventor.
Joseph Anton Boehler.
by his Atty N. DuBois.

UNITED STATES PATENT OFFICE.

JOSEPH ANTON BOEHLER, OF CARLINVILLE, ILLINOIS.

CORN-HARVESTER.

SPECIFICATION forming part of Letters Patent No. 537,140, dated April 9, 1895.

Application filed January 6, 1891. Serial No. 376,936. (No model.)

*To all whom it may concern:*

Be it known that I, JOSEPH ANTON BOEHLER, a citizen of the United States, residing at Carlinville, county of Macoupin, and State of Illinois, have invented certain new and useful Improvements in Corn-Harvesters, of which the following is a specification.

My invention relates to harvesters of that class in which reciprocating knives co-operate with suitable guides, gatherers, conveyers, and a sliding dropper frame to draw the stalks within reach of the knives to cut off the stalks and convey them to the sliding dropper frame, whence they are dropped in gavels on the ground.

The objects of my invention are, first, to provide suitable framework supporting the operating mechanism; second, to provide simple and effective means for guiding the stalks toward and gathering them into contact with the knives; third, to provide automatic gatherers which will draw the stalks into contact with the knives, and after having done so, turn back out of the way so as to not obstruct the fall of the stalks on the conveyers; fourth, to provide suitable cutting apparatus; fifth, to provide suitable conveyers to receive the cut stalks and at convenient intervals convey them to the sliding dropper frame; sixth, to provide a sliding dropper frame to receive the cut stalks from the conveyers and at suitable intervals deposit them in gavels on the ground; seventh, to provide simple and effective means for tilting, raising, or lowering the gatherers; eighth, to provide means for raising or lowering either side of the harvester frame; ninth, to provide means for throwing the conveyers and the sliding dropper frame into and out of gear at suitable intervals. I attain these objects by the mechanism shown in the accompanying drawings, in which—

Figure 4:
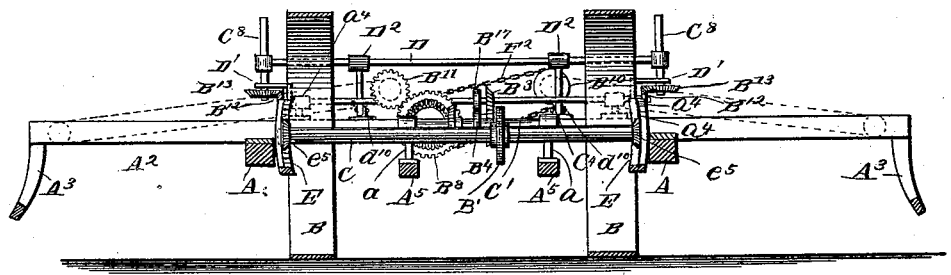
Figure 14:
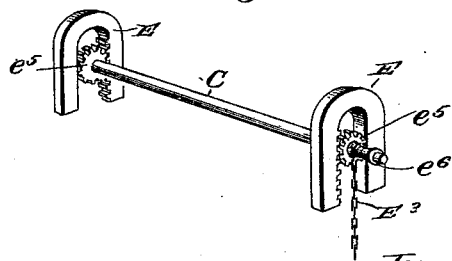
Figure 9A:
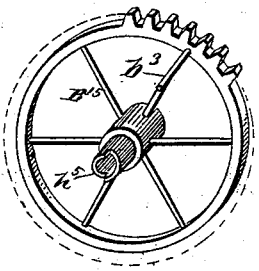
Figure 10A:
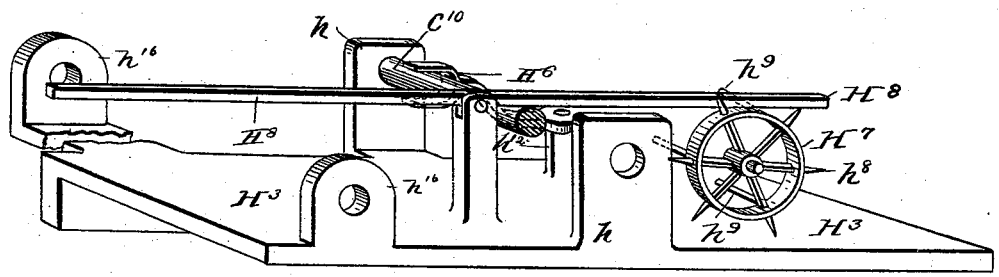
Figure 12:
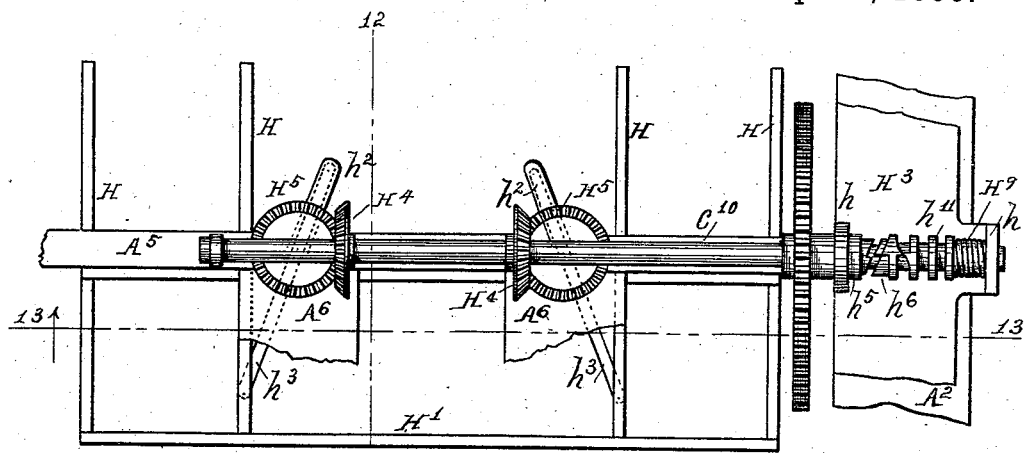
Figure 13:
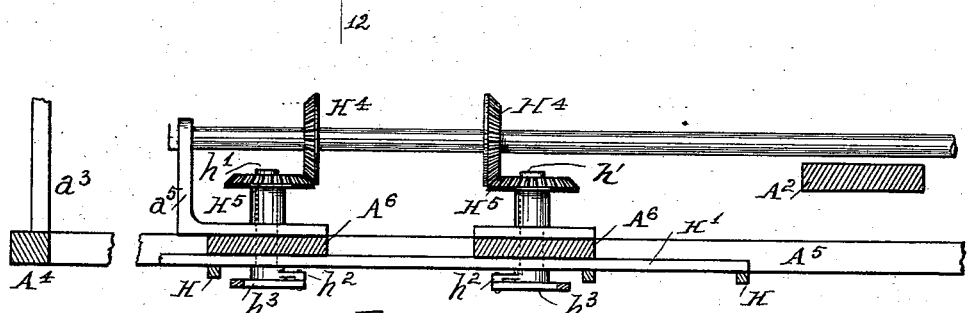
Figure 12A:
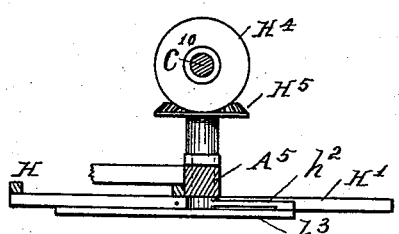
Figure 16:
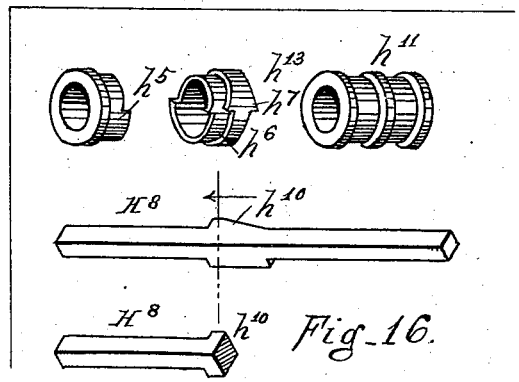

Figure 1 is a top view of the machine, with the conveyers removed. Fig. 2 is a side view of the machine, the gatherers being removed. Fig. 3 is a vertical longitudinal section on the line X. Fig. 4 is a vertical transverse section on the line X'. Fig. 5 is a vertical transverse section on the line $X^2$. Figs. 6, 7, and 8 show on an enlarged scale the details of the gatherers. Fig. $7^A$ is an enlarged partial vertical section through the segment plates $D^4$, $D^5$, on the axis of the shaft $C^8$, showing the sleeve within the segment plates. Fig. 9 is an enlarged top view of the shipper lever and the clutch mechanism controlling the starting of the elevators and the sliding dropper frame. Fig. $9^A$ is a detached view on an enlarged scale, showing the wheel $B^{15}$ and its hub. Fig. 10 is an enlarged partial side view of the same mechanism as shown in Fig. 9, the wheels $B^{14}$ and $B^{15}$, the standards $h$ adjacent to the wheel $B^{15}$, the clutch members $h^5$, $h^6$, and the ring $h^{11}$ being removed so as to show the relative position of the levers $H^8$, $H^{10}$, the finger wheel $H^7$, and the standards supporting those parts, and the shaft $C^{10}$ being shown in section so as to show the channel in said shaft. Fig. $10^A$ is a detached view on an enlarged scale of the lever $H^6$, its supporting standard and the fingered wheel on the lever. Fig. 11 is a vertical transverse section on the line 11 of Fig. 9. Fig. 12 is a top view of the mechanism operating the dropper frame, the finger wheel $H^7$ and the levers $H^8$, $H^{10}$, being removed. Fig. $12^A$ is a vertical transverse section on the line 12 of Fig 12. Fig. 13 is a partial vertical section through Fig. 12 on the line 13, the wheel $B^{15}$ and the clutch mechanism being removed. Fig. 14 is a partial enlarged detached view showing the position of the shaft C in the segmental guides E. Fig. 15 shows the connection of the lever $H^6$ with the ring $h^{11}$. Fig. 16 shows detached views of the lever $H^8$, the ring $h^{11}$ and the clutch member $h^6$. Fig. 17 is a detached view of the lever $H^{10}$. Fig. 18 is an enlarged detached view of one of the bars $D^2$ and shows the hinge by means of which the bar is connected with the cross piece $A^2$. Fig. 19 is a diagram illustrating the changed position of the finger wheel $H^7$, when the lever $H^6$ is shifted so as to disengage the fingers on the finger wheel from the pin on the wheel $B^{15}$.

Similar letters in all the figures refer to the same parts.

The main frame consists of side pieces A joined at their front ends to the end pieces A'. On top of and transverse to the side pieces A is secured the front cross piece $A^2$. At the rear end of and under the side pieces A are secured the cross pieces $A^4$. The front cross piece A' is connected with the rear cross pieces $A^4$ by means of the inside rails $A^5$ and the ends of the front cross piece $A^2$ are connected with the rear cross pieces $A^4$ by means of the outside rails $A^3$, which lie under the cross piece $A^2$ and on top of the cross pieces $A^4$.

Secured to the side pieces A are the segmental guides E having on one of their sides cogs into which mesh pinions $e^5$, on the ends of the shaft C. To the rings $e^6$ on the ends of the shaft C are secured chains which serve to tilt the frame as I will hereinafter describe.

To the axle C are secured the master wheels B. To the shaft C is also secured the sprocket wheel B'.

Journaled in the top of the standards $a$, secured to the center rails $A^5$, is the shaft C', to which are secured the sprocket wheel $B^2$, the bevel cog wheel $B^3$, the sprocket wheel $B^4$ and the bevel cog wheel $B^6$. This shaft is rotated by a sprocket chain F connecting the sprocket wheels B' and $B^2$. A bracket $a'$ secured to one of the inside rails $A^5$ supports in suitable bearings the shaft $C^3$. At the front end of this shaft is a bevel cog pinion $B^5$ which meshes with and receives motion from the bevel cog wheel $B^3$.

Secured to the top of the cross piece $A^2$ is the plate $H^3$ which supports in suitable bearings $h^{16}$ the shaft $C^2$. At the front end of the shaft $C^2$ is a bevel cog pinion $B^7$ driven by the wheel $B^6$ on the shaft C'. On top of the front cross piece $A^2$ and the rear cross pieces $A^4$ are secured the incline pieces $a^3$ which support in suitable bearings the upper conveyer rolls $C^5$ and $C^6$. The lower conveyer rolls $C^7$ have their ends journaled in the front cross piece $A^2$ and in bearings on the rear cross peces $A^4$.

The cog wheel $B^8$ and the sprocket wheel $B^9$ are loose on the shaft $C^2$. When engaged with the clutch-sleeve $b^4$ which slides on a feather on said shaft, the wheel $B^8$ drives the cog pinion $B^{11}$ which is secured to the conveyer roll $C^5$, and the sprocket wheel $B^9$ drives the wheel $B^{10}$ by means of the chain $F^2$.

At the rear end of the shaft $C^3$ is a crank G which connects by means of a pitman rod G' with the knife bar $G^4$ which carries the knives $G^2$, and as the crank revolves it imparts a reciprocating motion to the knives $G^2$ thereby cutting the stalks against the guards $G^3$ in a manner well known.

To the top of the cross piece $A^2$ are secured standards $a^4$, (clearly shown in Figs. 4 and 7) supporting in suitable bearings the shaft $C^4$. At each end of the shaft $C^4$ is a bevel cog wheel $B^{12}$ meshing with and driving the bevel cog pinion $B^{13}$ secured to the square shaft $C^8$. At the ends of the shaft $C^4$ are brackets D' (clearly shown in Fig. 7). The shaft $C^4$ passes horizontally through the bracket D' and the shaft $C^8$ passes vertically through the bracket D' and the bracket turns on the shaft $C^4$ so that as the gathering apparatus is raised, lowered or inclined as I will hereinafter describe, the relative position of the cog wheels $B^{12}$ and $B^{13}$ remains unchanged. On top of and suitably secured to the cross piece $A^2$ are the rods $D^2$ having hinges $d^{10}$ and supporting in suitable bearings the tubular cross bar D. Depending from and secured in any suitable manner to the tube D is the arm $D^3$, the lower part of which is parallel to the tube D and supports the segment plate $D^4$. To the ends of the tube D are suitably secured the upper segment plates $D^5$. The shafts $C^8$ are square and extend upward centrally through the lower segments $D^4$, the rings $D^6$, and the upper segments $D^5$. In the segments $D^5$ are thimbles $d^{11}$ having square holes in which the shafts move, so that as the tube D is raised or lowered it carries with it without changing their relative positions, the segment plates $D^4$, $D^5$, and the rings $D^6$.

Arranged alternately on the upper and under sides of the rings $D^6$ are pivoted equi-distant curved arms $D^7$, $D^8$, $D^9$, $D^{10}$, $D^{11}$, and $D^{12}$. One of them is shown in detail in Fig. 8, in which $d$ represents the longer branch and $d'$ the shorter branch of the arm, $d^2$ the hole through the arm, $d^3$ a projecting lug on the upper side and $d^4$ a projecting lug on the under side of the shorter branch $d'$, and $d^7$ a projecting lug on the longer branch $d$.

In operation the bevel cog wheel $B^{12}$ drives the cog pinion $B^{13}$ and gives to the ring $D^6$ a rotary motion in the direction indicated by arrow in Fig. 6. It will be observed that the ring $D^6$ rotates between the segments $D^4$ and $D^5$ but the segments are stationary and sufficiently above or below the ring to permit the points of the arms to fold back under the segment as shown by the position of the arm $D^8$.

To illustrate:—Assume the ring to be at rest in the position shown in Fig. 6. The arm $D^7$ is then in position to gather the standing stalks and as it revolves press them in against the knives, the arms $D^8$, $D^9$, $D^{10}$, and $D^{11}$, are folded back out of the way, while the arm $D^{12}$ is just beginning to come into action. Let the ring now begin to move and we will note the various positions of the upper set of arms. As the ring rotates it carries with it the several arms. The lug $d^7$ on the arm $D^{11}$ engages with the lug $d^6$ extending downward from the segment $D^5$ causing the arm to turn on its pivot, the point of the arm to move outward and the shorter branch $d'$ of the arm to move inward until the lug $d^3$ engages with the side of the segment $D^5$ throwing the arm around until the hub of the arm rides on the face of the segment $D^5$ and the arm assumes the position shown at $D^{12}$. The ring continuing to rotate, the hub and the lug $d^3$ on the shorter branch of the arm press against the face of the segment and prevent the arm from turning until it has traversed the whole face of the segment. When the rotation of the ring has carried the shorter branch of the arm off the face of the segment, the arm is free to turn on its pivot back out of the way as shown at $D^9$. The lug $d^4$ on the short branch of the arm engages with the lug $d^5$ on the ring to prevent the arm from moving too far inward, and so the arms are thrown successively out and in by the rotation of the ring.

I will now describe the construction of the sliding dropper frame and the mechanism operating same. This frame is rectangular in form and consists of transverse bars H joined at their outer ends by a bar H′ and near their inner ends by a bar H². By means of a crank and a pitman connected with gearing which I will hereinafter describe, it is moved laterally in and out as shown in Fig. 1; in which the solid lines indicate the "closed" position of the frame, and the dotted lines the "open" position of the frame. At the rear end of the shaft $C^2$ is a cog wheel $B^{14}$ which runs loose on the shaft except when engaged with the clutch $b^4$. (See Fig. 9.) The cog wheel $B^{14}$ meshes with and when in gear moves the cog pinion $B^{15}$ which is loose on the shaft $C^{10}$. Secured to the shaft $C^{10}$ are bevel cog wheels $H^4$, which mesh with the bevel cog pinions $H^5$ on the shafts $h'$ to move the cranks $h^2$ connected by the pitman rods $h^3$ with the sliding dropper frame, so that as the crank makes one half throw, it pushes the sliding dropper frame inward and as it makes the other half of the throw it pulls it outward. When the sliding dropper frame is pushed in it receives on its inwardly projecting ends the cut stalks as they are delivered from the conveyers as I will hereinafter explain. When sufficient stalks to form a gavel have accumulated they are deposited on the ground by the withdrawal of the sliding dropper frame above described. While the sliding dropper frame is withdrawn the conveyers are at rest and the cut stalks accumulate on the conveyers. When the sliding dropper frame is pushed in the conveyers are in motion and deliver the cut stalks to the dropper frame. After the sliding dropper frame is withdrawn and before it is again pushed in, it is necessary in order that the sliding dropper frame may not interfere with the discharged gavel, for the machine to move forward the length of the gavel, say about eight feet—before the frame is again pushed in.

There are then five successive operations in receiving and discharging the gavel, viz:— First, the sliding dropper frame is pushed inward and rests in position to receive the cut stalks; second, the conveyers are then set in motion and continue to deliver the stalks to the sliding dropper frame until enough have accumulated to form a gavel; third, the conveyers are then thrown out of gear, come to rest, and receive the cut stalks as they accumulate, until the conveyers are again started; fourth, as soon as the conveyers are at rest the sliding dropper frame is automatically started and withdrawn from under the gavel depositing it on the ground; fifth, the sliding dropper frame remains withdrawn until the machine has moved forward say eight feet when it is automatically started and again pushed in and the conveyers are again started and so on continuously.

I will now describe in the order stated the means by which I perform these operations. Secured to the top of the cross piece $A^2$ is the plate $H^3$ having vertical standards $h$ in which one end of the shaft $C^{10}$ is journaled. This shaft extends rearward and its other end is journaled in the standard $a^5$ on the cross piece $A^6$. A post $h^{17}$ on the plate $H^3$ supports the lever $H^8$. The cog wheel $B^{15}$ is held in place by the collar $h^4$. The hub $h^5$ of the wheel $B^{15}$ extends through the rear standard $h$ and is notched to form one half of a grooved clutch. The other half $h^6$ of the clutch slides on the shaft $C^{10}$ guided by a pin moving in a longitudinal channel in the shaft. The ring $h^{11}$ is loose on the shaft $C^{10}$. On the front edge of the half clutch $h^6$ is the cam $h^7$. The lever $H^6$ is pivotally supported on the standard $h^{12}$ and has journaled at its outer end a fingered wheel $H^7$ having six equi-distant fingers $h^8$ and three equi-distant projecting pins $h^9$. As the clutch $h^6$ revolves the cam $h^7$ engages with the cam $h^{14}$ on the ring $h^{11}$ to move one end of the lever $H^6$ and throw the other end of the same lever which carries the fingered wheel $H^7$ in such position as to bring the fingers of the wheel $H^7$ within reach of the projecting pin $b^3$ on the wheel $B^{15}$. When the fingered wheel $H^7$ is in this position the lateral pins $h^9$ lie under the lever $H^8$. On the lever $H^8$ is an integral wedge shaped lug $h^{10}$ extending laterally and downward and working in the groove around the clutch, as I will hereinafter explain. At each revolution of the wheel $B^{15}$ the pin $b^3$ engages with one of the fingers $h^8$ of the wheel $H^7$, causing the wheel $H^7$ to make one sixth of a revolution. When the wheel $B^{15}$ has completed two revolutions the fingered wheel $H^7$ has made one third of a revolution and the pin $h^9$ raises the lever $H^8$ and the lever rides on top of the grooved clutch, permitting the clutch to close. Simultaneously the spring $H^9$ reacts to close the clutch bringing into action the shaft $C^{10}$ sufficiently to throw the cranks and push in the dropper frame. The lever $H^{10}$ clearly shown in detached sketch (see Fig. 17) is fulcrumed on the post $h^{15}$ on top of the plate $H^3$ and has double forks as shown. One of these forks works in the groove in the clutch $b^4$ and the other carries the ring $h^{11}$. That fork which incloses the ring $h^{11}$ is connected with the ring by pins in the ends of the forks which prevent the ring from turning on the shaft $C^{10}$. (See Fig. 15.) The clutch sleeve $b^4$ slides on a feather and alternately engages with a half clutch on the hub of the wheels $B^9$ and $B^{14}$. The lever $H^8$ is fulcrumed on the post $h^{17}$ and the long end of the lever projects within easy reach of and is moved by the foot of the operator. There are two partial rotations of the shaft $C^{10}$, the first of which operates the mechanism to withdraw the sliding dropper frame from under the gavel, and the second to push back the sliding dropper frame across the opening between the conveyers after the gavel has been discharged. There are two diametrically opposite notches in that face of the clutch member $h^6$ next to the hub $h^5$. The clutch teeth on the sleeve $b^4$ at that end next to the wheel $B^{14}$ and on the adjacent hub of the wheel $B^{14}$ are deeper than the clutch teeth on the opposite end of the sleeve $b^4$. When the lever $H^8$ is moved by the operator so as to lift the lug $h^{10}$ out of the space between the clutch members $h^5$, $h^6$, the spring $H^9$ will react and shift the lever $H^{10}$ so as to disengage the clutch sleeve $b^4$ from the wheels $B^8$, $B^9$ and engage it with the wheel $B^{14}$. This starts the wheel $B^{14}$ and said wheel drives the wheel $B^{15}$ and the clutch member $h^6$ being in engagement with the wheel $B^{15}$ they make a half revolution together and turn the shaft $C^{10}$ so as to withdraw the dropper frame and discharge the gavel. When this half revolution is completed the lug $h^{10}$ drops into the second notch on the face of the clutch member $h^6$ and a little further rotation disengages the members $h^5$, $h^6$ causing the shaft $C^{10}$ to stop. The clutch sleeve $b^4$ however remains engaged with the wheel $B^{14}$ and the wheel $B^{15}$ driven by the wheel $B^{14}$ continues in motion. The pin $b^3$ then strikes a finger on the wheel $H^7$ and moves it one step. The wheel $B^{15}$ then makes a complete revolution alone and at the end of such revolution again strikes the pin $b^3$ and moves the wheel $H^7$ another step thus lifting the lever $H^8$ and the lug $h^{10}$ out of the space between the clutch members $h^5$, $h^6$ permitting them to engage and again start the shaft $C^{10}$. The wheel $B^{15}$ and the shaft $C^{10}$ then make a half revolution together closing the dropper. At the end of this half revolution the lug $h^{10}$ drops off the first notch into the opening between the clutch members $h^5$, $h^6$ and a little further rotation spreads them apart and brings the cams $h^7$, $h^{14}$ opposite one another, thus stopping the shaft $C^{10}$ and moving the ring $h^{11}$ so as to shift the lever $H^{10}$ sufficiently to disengage the sleeve $b^4$ from the wheel $B^{14}$ and engage it with the wheels $B^8$, $B^9$. This starts the conveyers $C^{11}$ and they continue to run until the lever $H^8$ is again lifted by the operator, and the operation above described is repeated.

When it is desired to discharge a gavel, the operator raises the lever $H^8$ which releases the spring $H^9$. The spring reacts to move the lever $H^{10}$ engaging the clutch $b^4$ with the wheel $B^{14}$, hus revolving the shaft $C^{10}$ sufficiently to open the dropper.

The conveyers consist of two endless canvas belts $C^{11}$ provided with longitudinal slats such as are ordinarily used on harvesters. The width of the conveyers is equal to the length of the rolls. One conveyer connects the rolls $C^5$ and $C^7$ and the other conveyer connects the rolls $C^6$, $C^7$ on the opposite side of the machine. These conveyers are set in motion and stopped as heretofore described.

The mechanism for tilting the gatherers is as follows:—The hinged rods $D^2$ supporting the tube D are suitably connected to the cross piece $A^2$. On the rails $A^5$ is secured a standard $a^6$, supporting the pivoted lever $d^8$, which is connected by means of the rod $d^9$ with the hinged rods $D^2$, so that as the lever $d^8$ is pushed forward the points of the gatherers are inclined forward. When the lever $d^8$ stands vertically the gatherers are horizontal, and when the lever is pulled back the gatherers are inclined rearward. By this means the gatherers may be adjusted to the height of the corn in which they are operating. Projecting forward and secured to the sides rails $A^3$ are guide rods $D^{13}$. These rods pick up the fallen stalks and guide them up within reach of the gatherers, by which they are seized and when cut off by the knives are thrown down on the conveyers.

The cutting mechanism is such as is commonly used in reapers and mowers and need not be described here.

The tilting mechanism consists of a vertical winch $E'$ supported in bearings in the standards $E^2$ secured to the cross piece $A'$. Near the lower end of the winch are secured the ends of two chains $E^3$. These chains pass around horizontal pulleys $e$ on the front cross piece $A'$, under vertical pulleys $e'$ near the bottom of the segmental guides E and have their other ends suitably secured to the rings $e^6$ on the ends of the shaft C in which the shaft turns, so that as the winch is turned in one direction, one chain winding up on the winch will lift one side of the machine, while the other chain unwinding will correspondingly lower the other side of the machine, and by this means either side of the machine may be raised or lowered at pleasure. On the ends of the axle C are slightly beveled cog pinions $e^5$ which turn loosely on the axle and mesh with internal racks on one side of the segmental guides E. These pinions are for the purpose of lowering one end of the axle while the other end is being raised, and the rack teeth are in front of the axle at one end and behind the axle at the other end of the axle. The pinions working in the rack serve to guide the ends of the axle and prevent it from slipping or binding while being raised or lowered. On top of the standard $E^2$ is a notched plate $e^2$ and near the handle of the winch is a latch $e^3$, which when the winch is turned falls into the notches of the plate and retains the winch in any desired position until the latch is released. Other chains $E^4$ are connected to the chains $E^3$, run back along the side pieces A, around suitable pulleys $e^4$ and have their ends secured to stems of the tillers $E^5$ so as to simultaneously raise or lower the tiller and the drive wheel on the same side of the machine.

The draft attachment is a tongue of the usual form connected to the cross piece $A'$. A sliding clutch $b^5$ on the shaft $C'$ throws all the mechanism into and out of gear.

In operation the horses walk in front of the drive wheel on opposite sides of the stubble row last cut. The machine going in one direction across the field cuts one row on the right hand side, and returning cuts one row on the left hand side of the machine. The stubble side of the machine is elevated so the machine will clear the stubble of the cut rows.

The operation of my machine is as follows: When the machine is started the clutch $b^5$ is shifted by means of the forked lever $b^6$ fulcrumed on the rail $A^5$ to engage the shaft $C'$ and the sprocket chain connecting the wheels $B'$ and $B^2$ rotates the shaft $C'$ which by means of the wheels $B^3$ and $B^5$ rotates the shaft $C^3$ and imparts a reciprocating movement to the knives. The gatherers are also started by means of a sprocket chain connecting the wheel $B^4$ with the wheel $B^{17}$ on the gatherer shaft $C^4$. As the machine moves forward the rods $D^{13}$ slide under the fallen stalks and guide them into the cutters, the gatherers draw the stalks to the knives which cut them off and the cut stalks fall upon the conveyers, by which they are carried and deposited on the sliding dropper frame. When sufficient stalks to form a gavel have accumulated on the sliding dropper frame the operator lifts the lever $H^8$ which sets in motion the mechanism by which the dropper frame is withdrawn and the gavel is discharged as heretofore described, the sliding dropper frame is again pushed in and the conveyers automatically started and run until another gavel has accumulated on the dropper frame, and so on continuously.

I am aware that upwardly inclined moving aprons have been used to convey cut stalks and deposit them on a rotating dropper at the side of a harvester. I am also aware that it is not new to deliver cut stalks to the center of the machine whence they are deposited on the ground, but I am not aware that intermittently moving inclined conveyers have been used adapted to convey cut stalks to an intermittently movable dropper frame at the center of the machine when said dropper frame is pushed in and adapted to rest and permit the accumulation of the cut stalks on said conveyers when the dropper frame is withdrawn or closed. I therefore do not claim broadly endless belt conveyers; neither do I claim broadly means adapted to deliver the cut stalks at the center of the machine whence they may be discharged and fall to the ground, but I restrict my claim to mechanism whereby the cut stalks may be delivered on intermittently running conveyers and may be by them carried and delivered to an intermittently moving central dropper frame when the dropper frame is closed, said conveyers and the means for operating same being so constructed and arranged that when the conveyers are in motion and carrying the stalks to the dropper frame the dropper frame is closed and when the dropper frame is withdrawn or open the conveyers are at rest and the stalks accumulate on the conveyers and remain there until the dropper frame is closed and the conveyers again started.

I do not claim broadly inclinably adjustable gatherers; neither do I claim broadly automatically extensible arms, but I restrict my claim to inclinably adjustable rotary gatherers revolving above the cutting mechanism and the conveyers and having automatically extensible arms, said gatherers being so constructed and arranged as to co-operate with the cutting and the delivering mechanism to gather in the inclined stalks, press them against the knives and after they are cut deflect them down on the conveyers, and said arms being so constructed and arranged that the arm which is immediately in front of the arm in action is automatically folded back so as not to interfere with the depositing of the cut stalks on the conveyers.

What I claim as new, and desire to secure by Letters Patent, is—

1. In a corn harvester the main frame and the supporting main wheels in combination with the sprocket wheels $B'$, $B^2$, the connecting sprocket chain, the shaft $C'$, the clutch $b^5$, the sprocket wheels $B^4$, $B^{17}$, the connecting chain, the shaft $C^4$, the tube D, the arm $D^3$, the brackets $D'$, the cog wheels $B^{12}$, $B^{13}$, the shaft $C^8$, the segments $D^4$, $D^5$, the rings $D^6$, and the arms $D^7$, $D^8$, $D^9$, $D^{10}$, $D^{11}$, and $D^{12}$, substantially as shown and described and for the purpose stated.

2. In a corn harvester, the combination of the main frame, the supporting wheels, the reciprocating cutters, the standards hinged on the main frame, the tube supported on said standards, the arms connected with the tube, the standards $a^4$ on the main frame, the shaft $C^4$ supported on said standards, the brackets $D'$, the cog wheels $B^{12}$, $B^{13}$, the shaft $C^8$, the segments $D^4$, $D^5$, the rings $D^6$, the arms $D^7$, $D^8$, $D^9$, $D^{10}$, $D^{11}$, and $D^{12}$, the standard $a^6$ on the main frame, the lever $d^8$ pivoted on the standard $a^6$, and the rod $d^9$ connecting the lever $d^8$ with the hinged rod $D^2$, as set forth.

3. In a corn harvester the combination of the main frame, the supporting wheels, the axle having adjustable bearings in segmental guides, and having at its ends chains connected in such manner with a winch secured to the main frame that when the winch is turned one chain will wind up as the other unwinds, and the chain connecting the winch with the caster wheel at the rear of the machine, all co-operating to lower one side of the machine as the other side is raised, substantially as shown and described.

4. In a corn harvester the main frame, the main axle, the supporting wheels, the sprocket wheel on the main axle connected by a chain with the wheel on the shaft $C'$, the cog wheel on the shaft $C'$, meshing with a pinion on the shaft $C^2$, in combination with the shaft $C^2$, the wheels $B^8$, $B^9$, the sliding clutch $b^4$, the cog wheels $B^{14}$, $B^{15}$, the lever $H^{10}$, the grooved clutch consisting of the hub $h^5$ and the clutch collar $h^6$, the lever $H^8$ fulcrumed on the plate $H^3$ and having a lug working in a groove around the clutch members $h^5$, $h^6$, the cam $h^7$ stantially as shown and described and for the purpose stated.

7. In a corn harvester, the main frame, the supporting wheels, the axle, the shafts $C'$ and